United States Patent [19]

Chang

[11] Patent Number: 5,622,201

[45] Date of Patent: Apr. 22, 1997

[54] BUCKET VALVE WITH REMOVABLE HANDLE

[76] Inventor: King Chang, No. 20, Hsi Wei St., San Chung City, Taipei Hsien, Taiwan

[21] Appl. No.: 608,412

[22] Filed: Feb. 28, 1996

[51] Int. Cl.[6] .............................. F16K 1/12; F16K 35/02
[52] U.S. Cl. ..................... 137/219; 251/99; 251/104; 251/110; 251/144; 251/291
[58] Field of Search .............................. 137/219; 251/95, 251/96, 98, 99, 110, 144, 291, 104

[56] References Cited

U.S. PATENT DOCUMENTS

| | | | |
|---|---|---|---|
| 1,087,635 | 2/1914 | Boyden | 251/99 |
| 1,758,727 | 5/1930 | Wildin | 251/104 |
| 1,894,830 | 1/1933 | Peterson | 251/110 |
| 2,939,674 | 6/1960 | Anderson | 251/99 |
| 3,148,704 | 9/1964 | Blass | 251/99 |
| 3,153,498 | 10/1964 | Bakker | 251/110 |
| 3,314,444 | 4/1967 | White, Jr. | 251/99 |
| 3,329,394 | 7/1967 | Overbaugh | 251/99 |
| 4,126,294 | 11/1978 | DeFrees | 251/99 |
| 4,159,102 | 6/1979 | Fallon et al. | 251/104 |
| 4,693,268 | 9/1987 | Fahl | 137/219 |
| 4,813,449 | 3/1989 | Fahl | 137/219 |
| 5,005,602 | 4/1991 | Fahl | 137/219 |
| 5,127,428 | 7/1992 | Fahl | 251/99 |

*Primary Examiner*—George L. Walton
*Attorney, Agent, or Firm*—Martin Korn

[57] ABSTRACT

A bucket valve with a removable handle includes a tubular valve body, a piston disposed with the valve body and a crank arm integrally formed of a central sleeve and two spaced fingers. The fingers are pivotally retained to the piston. A drive shaft is drivingly disposed in and extends from the central sleeve of the crank arm to project through and beyond the valve body to connect by a distal tip thereof to a handle via an axle sleeve. An 'L'-shaped latch is resiliently retained in the axle sleeve whereby the combined axle sleeve and handle are removably retained to the drive shaft. The handle has a forked tip forming an outer upper face, a central fork and an outer lower face against each of which a knob can abut in a first, second and third position respectively.

3 Claims, 6 Drawing Sheets

BUCKET VALVE WITH REMOVABLE HANDLE

BACKGROUND OF THE INVENTION

1. Field of the Invention

The present invention relates to bucket valve, more particularly to a bucket valve with removable handle for avoiding the valve being opened by others and possibility of oil leakage. Especially, the handle could be attached or removed without the need of any external tool to avoid exposing people and environment in unnecessary risk.

2. Description of Related Art

A conventional type of bucket valve used for oil entering and exiting from a tanker is shown in FIG. 7, which generally includes a valve body 90 defining a reentrant cavity 91 at the bottom, and a piston means 92 disposed within the valve body 90. A drive shaft 94, which is provided for driving the piston means 92 making a reciprocating motion, has a small gear 940 at one end to engage with a rack 920 on the piston means 92. The drive shaft 94 further is mounted with a handle 95 outside the valve body 90, whereby a gate 93 at a top of the piston means 92 can be controlled to close or open the valve body 90 according to requirement of an oil load. This type of bucket valve is controlled to open and close by means of rotating the handle 95 outside the valve body 90, i.e. to open the valve completely, the handle 95 should be rotated by a large angle and requires great effort in doing so. Secondly, the handle 95 of this type is designed to fixedly mount with the drive shaft 94 by which it is undesirably possible for unauthorized persons to open the valve and cause oil leakage.

The present invention therefore is aimed to provide a bucket valve with removable handle to mitigate and/or obviate the aforementioned problems.

SUMMARY OF THE INVENTION

One object of the present invention is to provide a bucket valve with removable handle to avoid unauthorized or unintentional opening of the valve and the possibility of oil leakage, since the handle could be attached or removed without the need of any external tool.

Another object of the present invention is to provide a bucket valve with removable handle which can be opened and closed by means of a simple operation.

In accordance with one aspect of the present invention, the bucket valve with removable handle comprises a valve body and a piston means disposed within said valve body, a crank arm integrally comprising a central sleeve and two spaced fingers extending therefrom, said fingers being attached to the piston means to drive the piston means axially, a drive shaft mounted to the central sleeve of the crank arm, wherein one end of the drive shafts extends through and projects beyond said valve body, said end of drive shaft defining a hexagonal projection, said hexagonal projection defining a socket at a bottom thereof, a handle removably mounted with one end of the drive shaft which is extended out of the valve body, said handle defining a bore at one end, and an inverted-L shaped axle sleeve having a horizontal part and a vertical part, said horizontal part disposed within said bore of the handle and engaged with said hexagonal projection of the drive shaft, said axle sleeve defining and including a cavity corresponding to the connecting block of the drive shaft at a back of the horizontal part of the sleeve; a stepped passage extending through the vertical portion of the sleeve and communicating with the cavity; an L-shaped latch disposed within said stepped passage and protruding into the socket of the hexagonal projection of the drive shaft. A protrusion integrally extends from where the axle sleeve is engaged with the handle.

In accordance with another aspect of the present invention, the valve body defines a plurality of holes at a periphery of its top end for a corresponding plurality of bolts to threadedly engage therein after extending through a front-end ring. A reentrant bowl is formed at a lower portion inside the valve body for permitting oil to exit and enter therefrom, said reentrant bowl having an upright projection formed in a base thereof with a first bore vertically defined therein to receive the piston means; a conduit formed at the outside wall thereof and defining a second bore for the drive shaft to extend therethrough, said conduit having a first end and a second end receiving an outer bushing and an inner bushing respectively. A blind threaded hole is defined in the outside wall of the valve body, said blind hole threadedly receiving a tapered knob, said tapered knob provided for locating the handle.

In accordance with a further aspect of the present invention, the piston means is stepped in form and T-shaped cross-section and comprises a piston head formed on a top thereof. A journal integrally extends from a bottom of said piston head, said journal defining a transverse slot therein for a pivot pin which is mounted to the crank arm to extend therethrough. A column extends integrally from a lower face of said journal and a lower end thereof is slidingly received in the first bore of the re-entrant bowl. A coil spring is received around the column and compressed between the lower face of the journal and a bottom of the reentrant bowl.

In accordance with still a further aspect of the present invention, the crank arm further defines a passage through the central sleeve thereof for allowing the drive shaft to extend therethrough and two holes respectively defined near a distal tip of each of the fingers, whereby the pivot pin links the crank arm with the piston means.

Other objects, advantages, and novel features of the invention will become more apparent from the following detailed description when taken in conjunction with the accompanying drawings.

DETAILED DESCRIPTION OF PREFERRED EMBODIMENT

Figure 1:
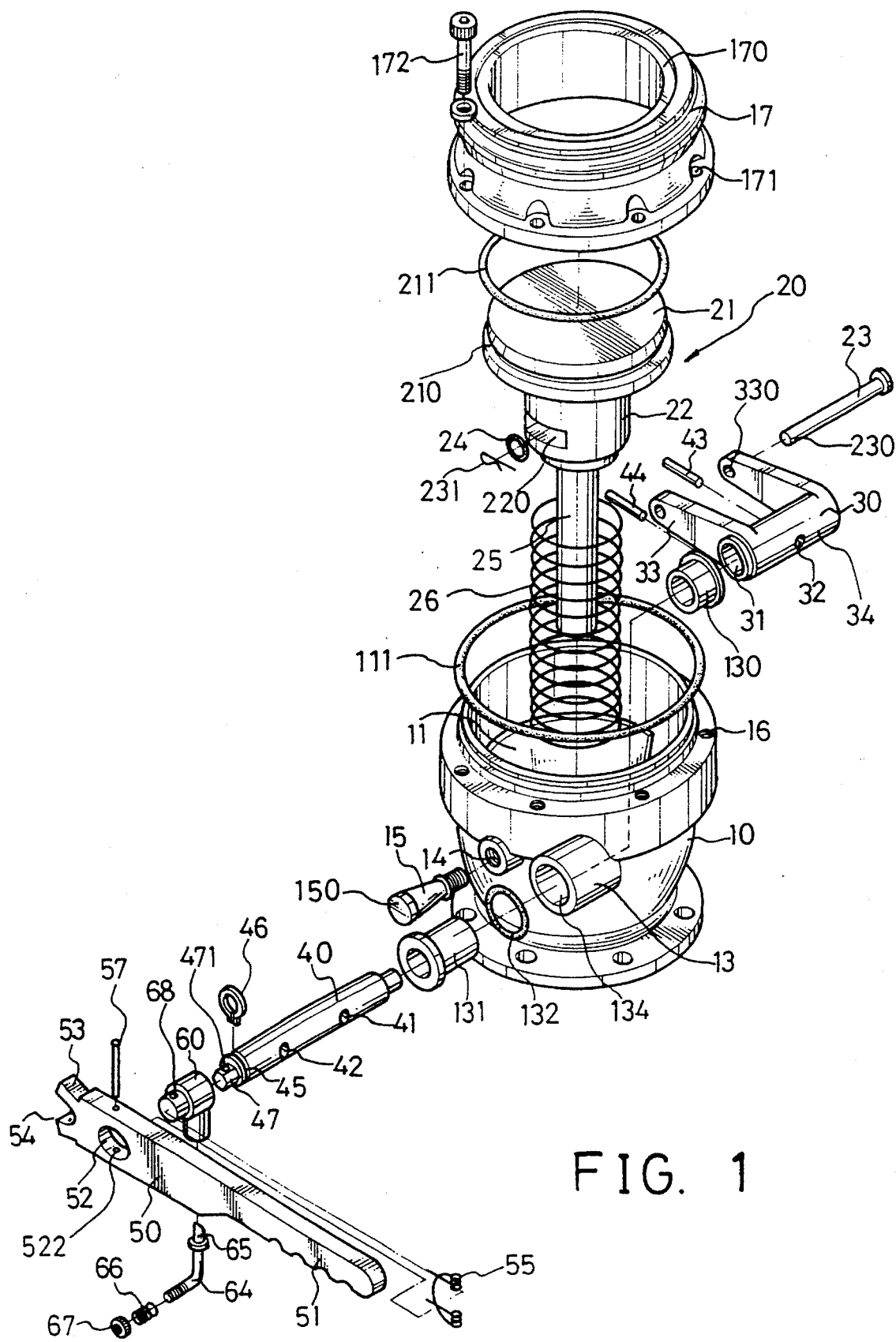
FIG. 1 is an exploded perspective view showing a bucket valve of the preferred embodiment in accordance with the present invention.

Referring to FIG. 1, there is a perspective view showing a bucket valve of the preferred embodiment in accordance with the present invention. The bucket valve with removable handle mainly comprises a valve body 10, a piston means 20, a crank arm 30, a drive shaft 40, a handle 50 and an axle sleeve 60 for removably mounting the handle 50 with the drive shaft 40.

Figure 2:
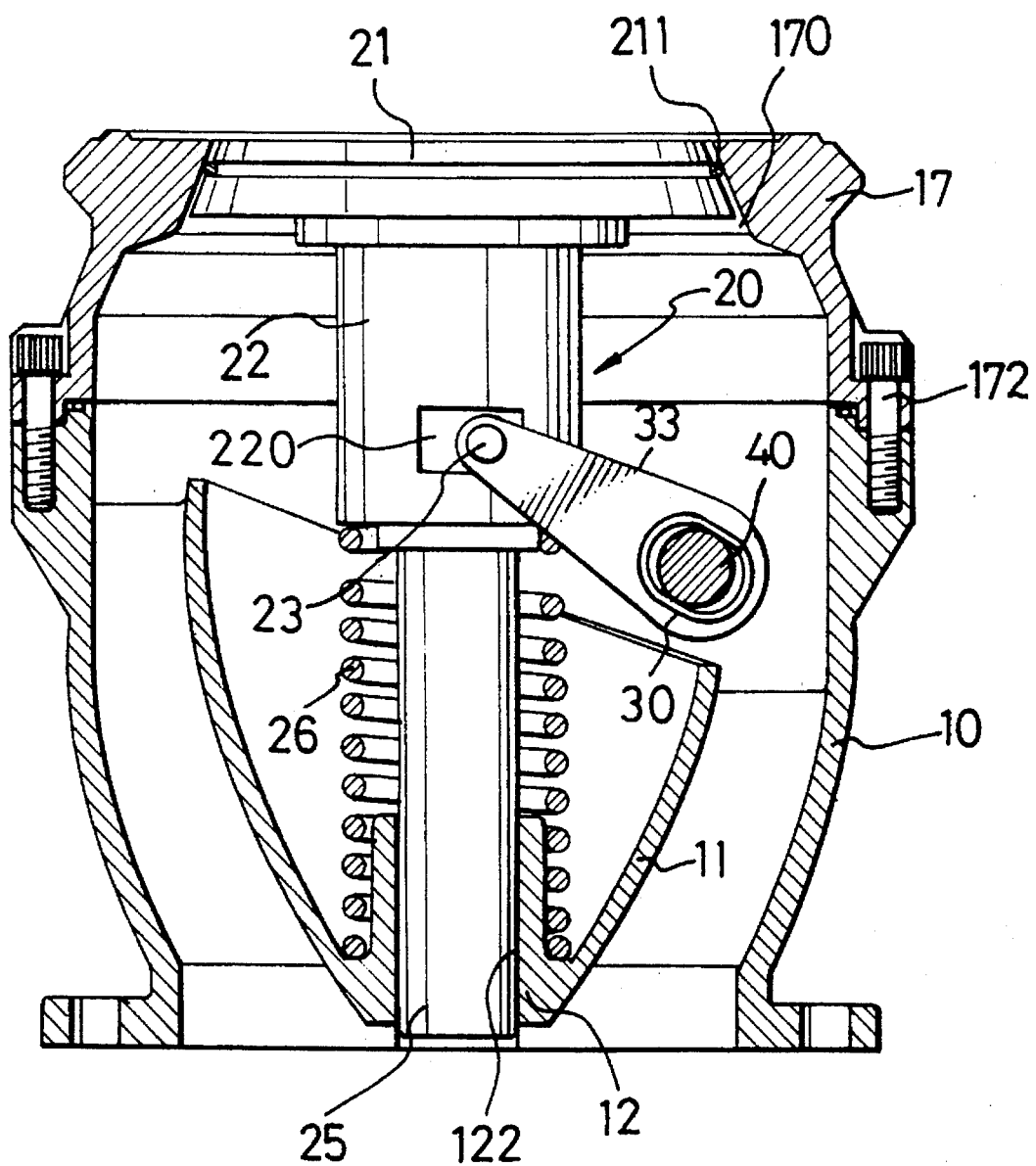
FIG. 2 is a cross-sectional view of the bucket valve of FIG. 1.
Figure 7:
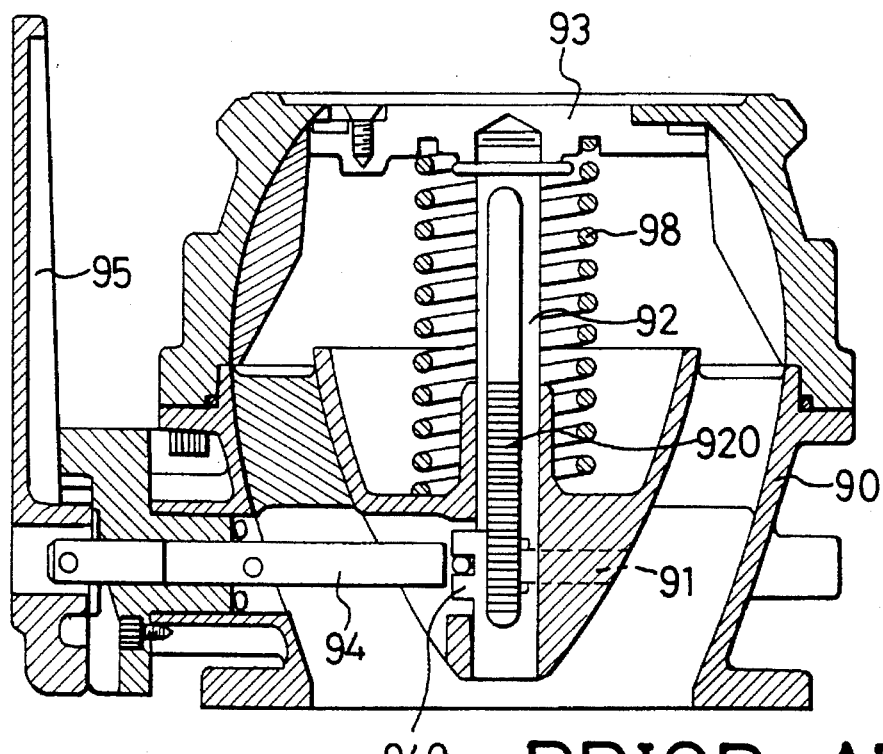
FIG. 7 is a cross-sectional view showing a conventional dual valve.
Figure 4:
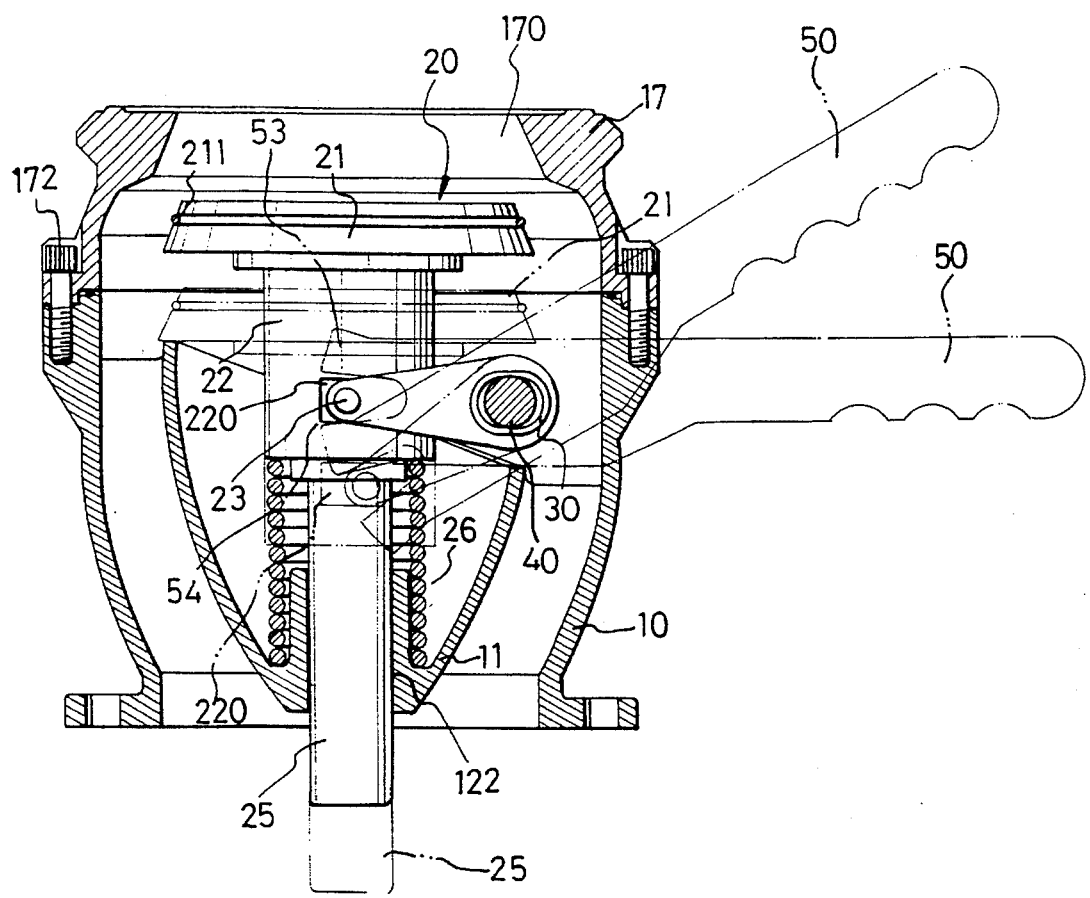
FIG. 4 is a schematic view showing the operation of the bucket valve of FIG. 1.

In FIGS. 1, 2 and 4, it can be seen that the valve body 10 is substantially tubular with a re-entrant bowl 11 integrally formed in a lower portion thereof and supported by a plurality of integral webs extending radially between the valve body 10 and the bowl 11. The re-entrant bowl 11 has an upright projection 12 formed in a center thereof and a first bore 122 is vertically defined in the upright projection 12. A conduit 13 is integrally and transversely formed in the valve body 10, extending from an outer wall thereof and defining a second bore 134 therein such that the drive shaft 40 may extend therethrough. The conduit 13 has a first end and a second end, the first end receiving an inner bushing 130 in the second bore 134 and the second end receiving an outer bushing 131 in the second bore 134 with a first O-ring 132 sandwiched between the conduit 13 and the outer bushing 131 to create a fluid-tight seal therebetween. The outer wall of the valve body 10 has a first blind hole 14 defined by a threaded periphery to threadedly receive a taper knob 15. The taper knob 15 has a head 150 sized to engage with a forked tip 53 formed at a first end 54 of the handle 50. It is to be noted that the first blind hole 14 and the conduit each have a longitudinal axis which is parallel to and spaced apart from the other longitudinal axis. The valve body 10 further defines a plurality of equispaced first holes 16 in a top end thereof, each first hole 16 being defined by a threaded periphery. A front end ring 17 has a circular wall which defines an opening 170 at a center thereof and an inner face of the circular wall forms a first inclination. A plurality of plain holes 171 are defined around an outer circumference of the front end ring 17 and are sized and spaced to align with the first holes 16 of the valve body 10 such that a corresponding plurality of bolts 172 may extend through the respective plain holes 171 to be threadedly received in the holes 16. Accordingly the front end ring 17 and the valve body 10 are secured together. A second O-ring 111 may be sandwiched between the front end ring 17 and the valve body 10 to provide a fluid-tight seal therebetween.

The piston means 20, which is stepped in form and substantially T-shaped, is disposed within the valve body 10 and includes a piston head 21 formed at a top end thereof wherein an outer periphery of the piston head 21 has a second inclination sized and configured to match the first inclination of the front end ring 17. The outer periphery of the piston head 21 further defines a ring groove 210 for a third O-ring 211 to be received therein. The piston means 20 further comprises a journal 22 integrally extending from under the piston head 21 and which defines a transverse slot 220 for a pivot pin 23 to extend therethrough, and a column 25 integrally and downwardly extending from a lower face of the journal 22.

The crank arm 30 is substantially U-shaped and is defined by a pair of spaced-apart fingers 33 each integrally joined to a central sleeve 34 at second ends thereof. A first end of each finger defines a transverse bore 330 therethrough, each bore 330 being in alignment with each other. The pivot pin 23 has a first end with a large head and a second end with a transverse pin hole 230 defined therethrough. A shank of the pin 23 is sized to be slidingly received in the transverse bores 330 of the crank arm 30. A distance between the spaced-apart fingers 33 is slightly greater than a diameter of the journal 22 such that the journal 22 can be received within the fingers 33 after which the pin 23 is extended through one of the transverse bores 330, the transverse slot 220 of the journal 22 and a second of the transverse bores 330 thereafter a washer 24 is fitted over the first end of the pivot pin 23 and a wire catch 231 is secured in the transverse pin hole 230 of the pivot pin 23 to securely yet pivotally retain the crank arm 30 to the piston means 20. The central sleeve 34 defines a passage 31 in which a first end portion of the drive shaft 40 is slidingly received. A first peg hole 32 is transversely defined through the central sleeve 34 at a mid-point thereof and a corresponding second peg hole 41 is transverse defined through the drive shaft 40 near the first end thereof. A first peg 43 is sized to have an interference fit in the first peg hole 32 and the second peg hole 41 such that when the first end of the drive shaft 40 is extended through the outer bushing 131, the conduit 13, the inner bushing 130 and the passage 31 of the crank arm 30, the first peg hole 32 and second peg hole 41 align with each other and the first peg 43 extends therethrough such that the drive shaft 40 is drivingly engaged to the crank arm 30.

A coil spring 26 extends around the column 25 of the piston means 25 and the column 25 is slidingly received in the bore 122 such that a first end of the spring 26 urges against the lower face of the journal 22 and a second end of the spring is disposed at a base of the projection 11, whereby the piston means 20 is urged to an extended position as seen in FIG. 2.

The drive shaft 40 further has a second end which protrudes beyond the conduit 13, a distal tip thereof having a reduced diameter and formed as a hexagonal projection 47. A spring-loaded retainer 471, such as a ball-bearing is disposed in the hexagonal projection 47. A circumferential slit 45 is defined in the shaft 40 near the distal tip for retaining means such as a 'C'-clip 46 to be removably disposed therein. A third peg hole 42 is defined transversely through the drive shaft 40 between the second peg hole 41 and the circumferential slit 45. A second peg 44 is sized to be received in the third peg hole 42 in an interference fit. It is to be noted that when the drive shaft 40 is disposed in the conduit, the third peg hole 42 is located between the outer bushing 131 and the inner bushing 130 such that the second peg prevents the drive shaft 40 from disengaging from the valve body. Furthermore the 'c'-clip 46 also functions to retain the drive shaft in position.

Figure 3:
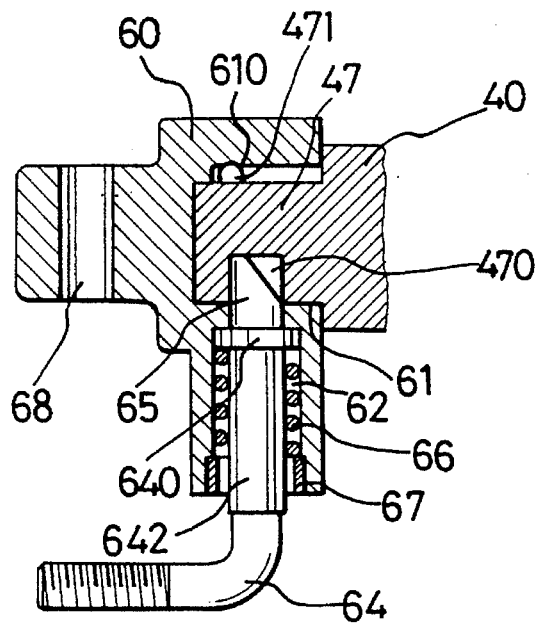
FIG. 3 is a cross-sectional view showing the engagement of the axle sleeve with the drive shaft of the bucket valve of FIG. 1.

Referring to FIG. 3, the hexagonal projection 47 further defines a socket 470 in a face opposite to the spring-loaded retainer 471. The axle sleeve 60 is substantially shaped as an inverted 'L' and is formed of a horizontal portion, a vertical portion and a central portion extending integrally therebetween. The horizontal portion defines a vertical fourth peg hole 68 sized to receive a third peg 57 therein in an interference fit. The central portion defines a cavity 61 sized and configured to receive the hexagonal projection 47. The vertical portion defines a stepped passage in which an 'L'-shaped latch 64 is received. The latch 64 is received. The latch 64 has an upright portion and a perpendicular lower portion extending integrally therefrom. The upright portion has an oblique tip 65, a flange 640 below the oblique tip 65 and a shank 642. The perpendicular portion has a threaded periphery. The oblique tip 65 is sized to be removably received in the socket 470 of the hexagonal projection 47. The flange 640 is sized to be slidingly received in stepped passage 62 of the axle sleeve 60. A collar 67 is fixedly retained in the stepped passage 62 near a free end of the axle sleeve 60 such that a second coil spring 66 may be retained within the vertical portion of the axle sleeve 60 and urge against a lower face of the flange.64 with a first end thereof and a second end thereof resting on the collar 67. Accordingly, the 'L'-shaped latch 64 in a first position is urged upwardly by the second coil spring 66 such that the oblique tip 65 is retained in the socket 470. In a second position, the 'L'-shaped latch 64 can be pulled downwardly to overcome a resistance of the second coil spring 66 such that the oblique tip 65 can be disengaged from the drive shaft 40.

Figure 5:
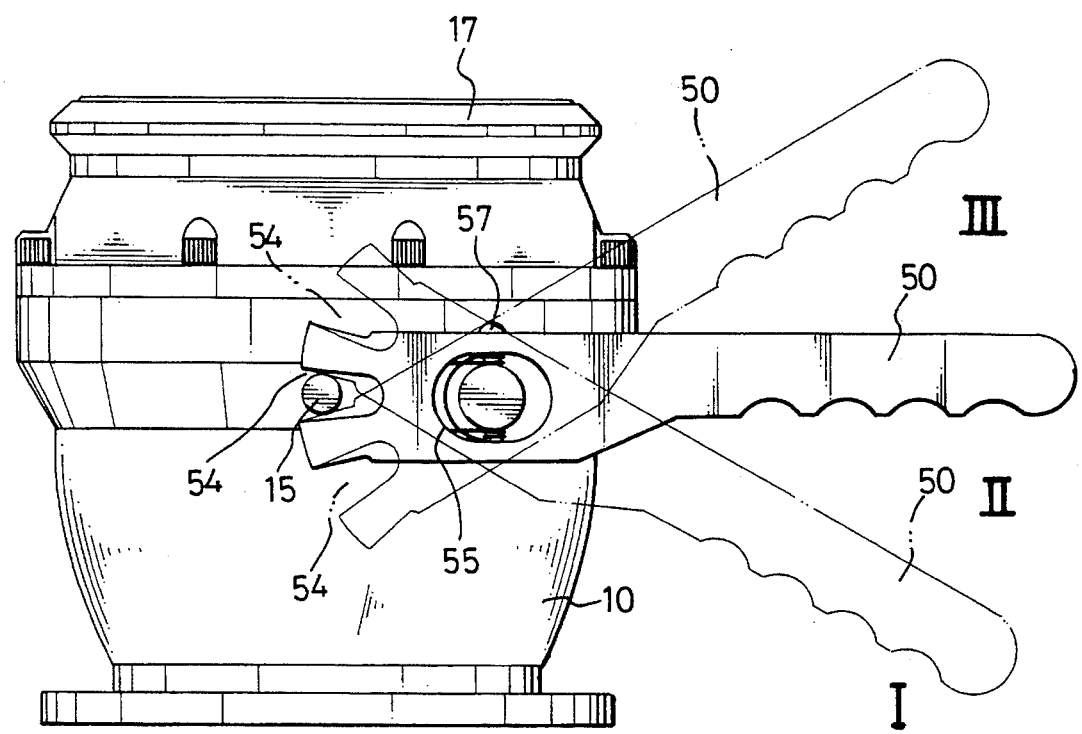
FIG. 5 is another schematic view showing the operation of the bucket valve of FIG. 1.
Figure 6:
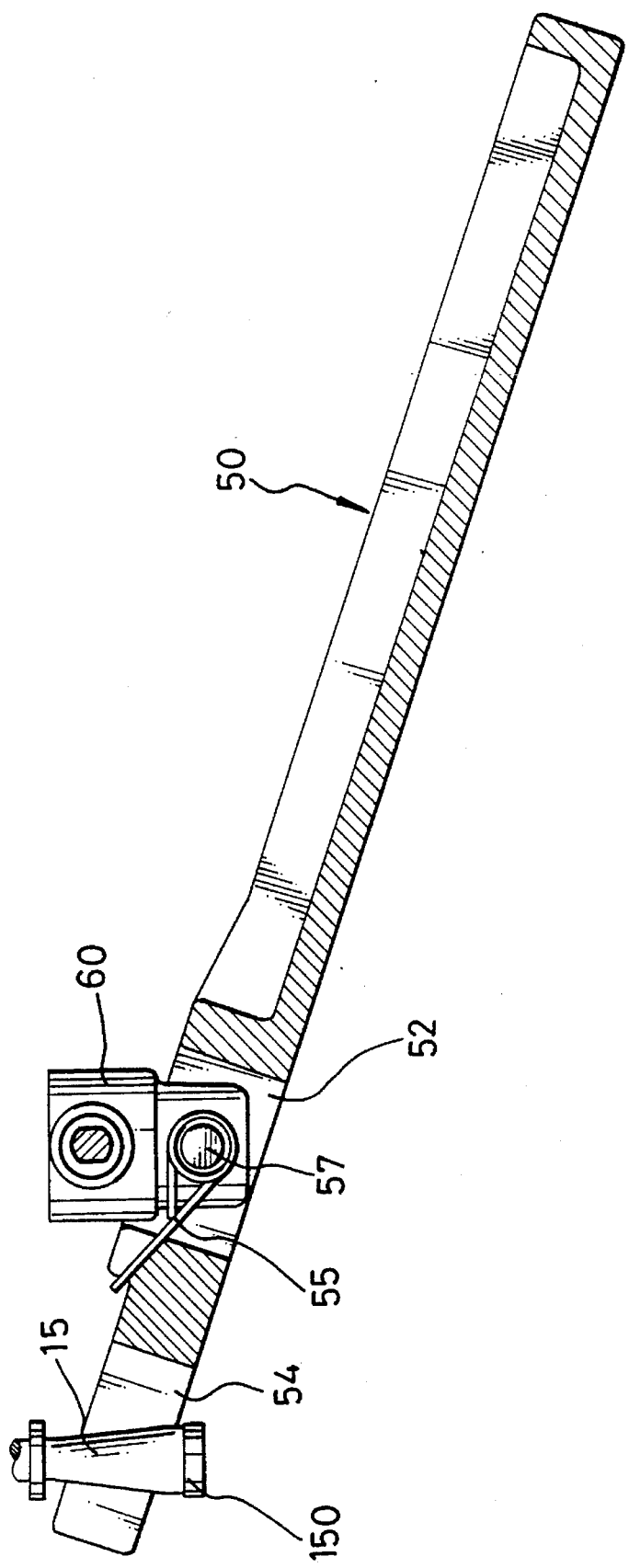
FIG. 6 is a cross-sectional view showing assembly of the handle of FIG. 1.

The handle 50 includes the forked tip 53 formed at the first end 54, a middle portion and a grip 51 at a second end. As previously mentioned, the forked tip 53 receives the taper knob 15 therein and can further abut against the taper knob 15 by an upper face and a lower face, thereby defining a first, second and third status of the handle as shown in FIG. 5 by numerals I, II, III. The middle portion defines a third bore 52 sized to receive the horizontal portion of the axle sleeve 60 where a fifth peg hole 522 is vertically defined in the middle portion of the handle 50 and in communication with the third bore 52. When the horizontal portion of the axle sleeve 60 is received in the third bore 52 of the handle 50, the fourth peg hole 68 aligns with the fifth peg hole 522 such that the third peg 57 can extend therethrough to lock the axle sleeve 60 to the handle. An arcuate spring 55 is retained between and an end face of the axle sleeve 60 and a side face of the handle 50.

In a normal status, the handle 50 is not attached to the bucket valve. To attach the handle 50 to the bucket valve, the cavity 61 of the axle sleeve 60 is offered to the hexagonal projection 47 of the drive shaft 40. The oblique tip 65, which in FIG. 1 is facing an end face of the hexagonal projection 47 is urged against the end face and accordingly the 'L'-shaped latch 64 is urged downwardly overcoming resistance of the second coil spring 66 until the oblique tip 65 aligns with the socket 470 of the drive shaft 40 whereupon the second coil spring 66 urges the 'L'-shaped latch 64 upward to extend into the socket 470. It is appreciated that as the handle 50 is fitted to the axle sleeve 60 as previously described, the handle 50 is now drivably engaged to the bucket valve without the need of any external tool.

To remove the handle 50 from the bucket valve, the 'L'-shaped latch 64 is simply manually pulled downwardly overcoming resistance of the second coil spring 66 until the oblique tip 65 is disengaged from the socket 470 of the drive shaft 40. At this time, the latch 64, the axle sleeve 60 and the handle 50 can be taken off in an easy and convenient manner without the need of any external tool.

In a first status as indicated by "I" in FIG. 5, the lower face of the forked tip 53 abuts the knob 15 and the piston means 20 is in an upper most position due to the spring force of the first coil spring 26 whereby the bucket valve is closed.

To achieve a second status as indicated by "II" in FIG. 5, the handle is pivoted outwardly by first slightly raising the forked tip 53 of the handle 50 so that the lower face of the forked tip 53 can clear the head 150 of the knob 15 and then the arcuate spring 55 urges the handle 50 away from the valve body and the knob 15 whereafter a user applies sufficient upward pressure to the grip 51 of the handle 50 to overcome the spring force of the first coil spring 26 such that the knob 15 can be engaged within the forked tip 53 whereby the bucket valve is retained in a semi-opened condition.

To achieve a third status as indicated by "III" in FIG. 5, the handle 50 is again pivoted outwardly in a similar manner as employed to achieve the second status so that upper most face of the forked end abuts against the knob 15 whereby the bucket valve is retained in a completely opened condition.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What the invention claimed is:

1. A bucket valve assembly comprising:

a valve body;

a front end ring fixedly attached to said valve body;

a piston means slidably received within said valve body, said piston means having a transverse slot extending therethrough;

a coil spring disposed between said valve body and said piston means to urge said piston means in a direction to close said front end ring;

a knob attached to said valve body;

a drive shaft rotatably mounted to said valve body;

a crank arm having a central sleeve and a pair of fingers, said central sleeve being telescopically fastened to said drive shaft to be rotatable about a central axis of said drive shaft;

a pivot pin cross-linking said pair of fingers and passing through said piston means transverse slot with said pair of fingers disposed on opposite sides of said piston means;

an axle sleeve drivingly coupled to one end of said drive shaft;

a handle pivotably secured to said axle sleeve, said handle having a forked tip for selectively engaging said knob, said handle being pivotable to displace said forked tip away from said knob and being rotatable to thereby drive said axle sleeve, via said drive shaft, said crank arm and said pivot pin, to move said piston means in a direction toward and away from said front end ring; and a spring biased latch slidably and removable engages said axle sleeve and being releasably engageable with said one end of said drive shaft to removably couple said axle sleeve to said drive shaft or locking said handle and said piston means in said selected valve positions.

2. The bucket valve assembly of claim 1, wherein;

said axle sleeve includes a horizontal portion, a vertical portion and a central portion extending integrally therebetween, said horizontal portion having a vertical peg aperture, said vertical peg aperture having a bore having a diameter, said vertical portion having a stepped passage, and said central portion having a hexagonal cavity;

said drive shaft end engaged with said hexagonal cavity of said axle sleeve central portion and including a socket formed in said end;

said handle having a bore having a diameter substantially larger than said vertical peg aperture bore, a handle peg aperture and a peg, said handle bore pivotally receiving said horizontal portion of said axle sleeve by passing said peg through said handle peg aperture and said vertical peg aperture; and said latch includes an oblique tip slidably received within a small diameter portion of said stepped passage, a flange slidably received within a large diameter portion of said stepped passage, a shank, a collar disposed at an end of said large diameter portion of said stepped passage, and a shank spring mounted around said shank and compressed between said flange and said collar, said oblique tip being extendable to engage said socket of said drive shaft and being retractable against a spring force from said shank spring to disengage from said socket of said drive shaft.

3. The bucket valve assembly of claim 2, and further including:

a peg spring mounted over said peg and compressed between said horizontal portion of said axle sleeve and a portion of said handle which is between said forked tip and said handle bore, said peg spring biasing said handle to disengage from said knob.

* * * * *